United States Patent Office 3,326,898
Patented June 20, 1967

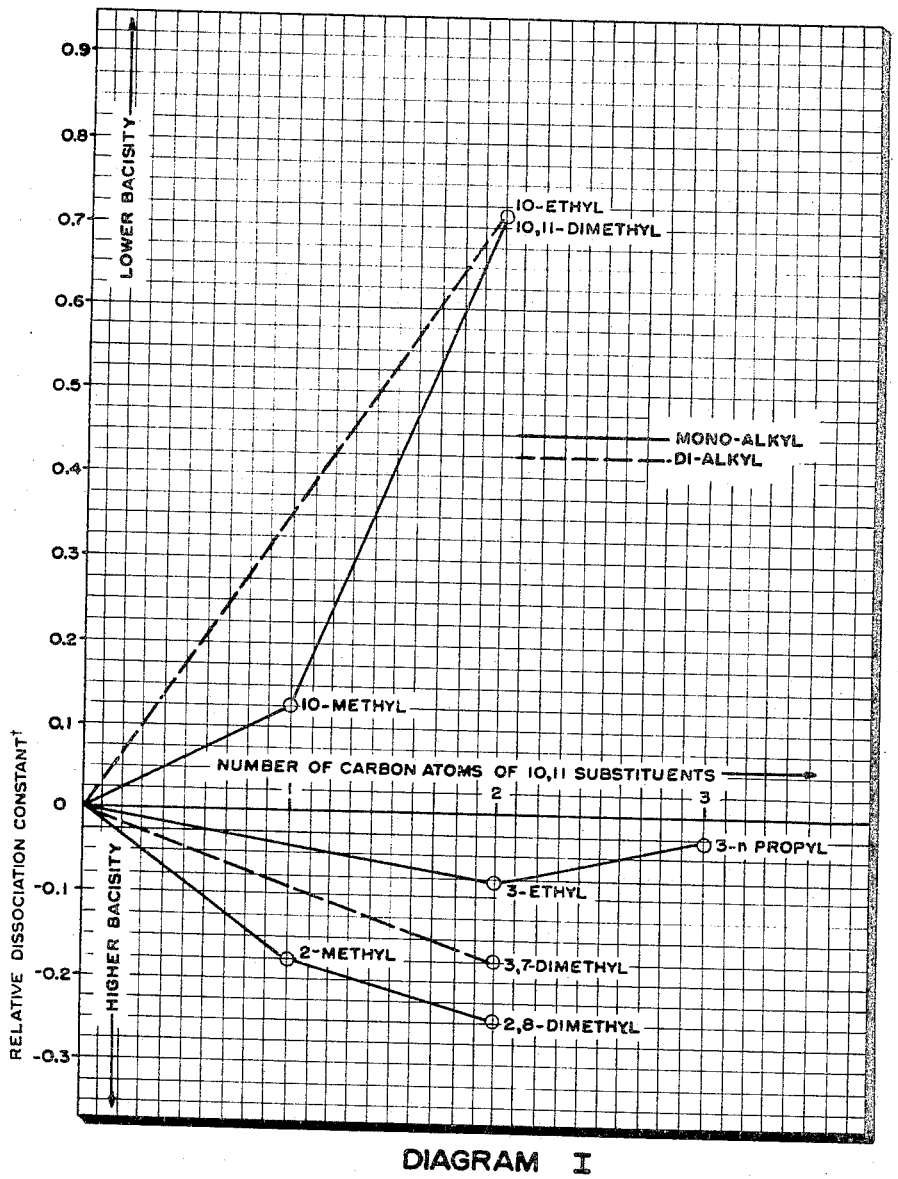
DIAGRAM I
†THE VALUES FOR THE RELATIVE DISSOCIATION CONSTANT ARE BASED ON THE VALUE FOR 10,11-UNSUBSTITUTED 10,11-DIHYDRO-5H-DIBENZ (b,f) AZEPINE TAKEN AS ZERO.
Walter Schindler and Hans Blattner, INVENTORS
BY *Wenderoth, Lind and Ponack,* ATTORNEYS

3,326,898
CERTAIN 11-SUBSTITUTED-5H-DIBENZ[b,f]
AZEPIN-10-ONE COMPOUNDS
Walter Schindler, Riehen, near Basel, and Hans Blattner, Basel, Switzerland, assignors to Geigy Chemical Corporation, Ardsley, N.Y., a corporation of Delaware
Continuation of application Ser. No. 242,719, Dec. 6, 1962. This application Mar. 21, 1966, Ser. No. 536,150
Claims priority, application Switzerland, Apr. 17, 1962, 4,682/62
5 Claims. (Cl. 260—239)

This application is a continuation of our copending application Serial No. 242,719, filed December 6, 1962, which in turn was a continuation-in-part of our copending applications Serial No. 69,302, filed November 16, 1960 (now abandoned), Serial No. 128,955, filed August 3, 1961 (now U.S. Patent No. 3,130,191) and Serial No. 128,954, filed August 3, 1961 and now abandoned.

The present invention is concerned with dibenz[b,f]-azepine derivatives of the formula

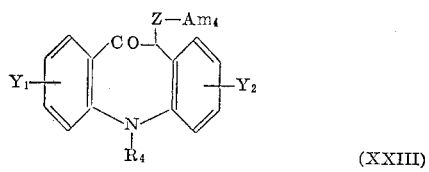

(XXIII)

wherein each of $Y_1$ and $Y_2$ signifies H, Br, Cl or lower alkyl, Z represents a straight or branched chain alkylene radical having 1 to 6 carbon atoms, $R_4$ is lower alkyl, allyl or benzyl, and $Am_4$ is di-lower alkylamino, pyrrolidino, piperidino, morpholino, 4-methyl-piperazino, N-benzyl-N-lower alkylamino, N-formyl-N-lower alkylamino, N-lower alkoxycarbonyl-N-lower alkylamino, N-lower alkanoyl-N-lower alkylamino and N-benzoyl-N-lower alkylamino.

Compounds XXIII are useful as intermediates for the production of azepine derivatives of the formulae

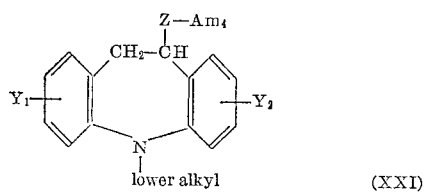

(XXI)

and

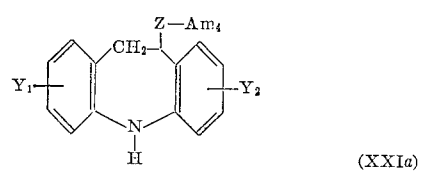

(XXIa)

wherein $Y_1$, $Y_2$, Z and $Am_4$ have the previously-indicated significances.

As illustrated in the flowsheet below, the compounds of the general Formula XXI are produced by first condensing, with the aid of an alkaline condensing agent, a compound of the general formula

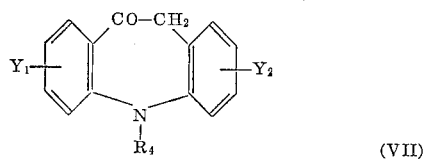

(VII)

wherein $R_4$, $Y_1$ and $Y_2$ have the meaning given above, with a reactive ester of the general formula $$Q-Z-Am_4 \quad (XXII)$$

wherein Q signifies chlorine, bromine, iodine or mesyloxy or tosyloxy, and $Am_4$ and Z have the meanings given above, to obtain compounds of the formula

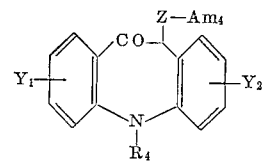

(XXIII)

wherein $Y_1$, $Y_2$, $R_4$, Z and $Am_4$ have the above-given meanings.

Suitable alkaline condensing agents are, in particular, sodium amide, lithium amide, potassium amide, sodium hydride, butyl lithium, phenyl lithium, lithium hydride or sodium hydride. The reaction is completed advantageously at elevated temperature, preferably 60 to 120° C. in the presence of an inert aromatic hydrocarbon solvent such as benzene, toluene or xylene or lower alkyl ether such as dioxan. Also, for example, potassium carbonate in a suitable alkanone solvent such as acetone, can be used as condensing agent.

The preparation of compounds of Formula VII is described, with reference to the representative wherein R=methyl, in Example 1, infra.

Examples of such starting materials suitable for this process aspect of the invention are, for instance, 5-methyl-, 5-ethyl-, 5-allyl- and 5-benzyl-10,11-dihydro-5H-dibenz[b,f]-azepine-10-one.

As reactive esters of compounds of the general Formula XXII, the halides in particular are used and also, e.g. p-toluene sulfonic acid ester, 2,4-dinitrobenzene sulfonic acid ester and methane sulfonic acid ester. As examples can be named:

β-dimethyl-amino-ethyl chloride,
β-methylethylamino-ethyl chloride,
β-diethyl-amino-ethyl chloride,
β-(di-n-butylamino)-ethyl chloride,
β-dimethylamino-propyl chloride,
γ-dimethylamino-propyl chloride,
γ-(methylisopropylamino)-propyl chloride,
γ-diethylamino-propyl chloride,
γ-dimethylamino-butyl chloride,
γ-dimethylamino-β-methyl-propyl chloride,
γ-dimethylamino-butyl chloride,
γ-(N-methylbenzylamino)-propyl chloride,
γ-(N-ethylbenzylamino)-propyl chloride,
β-(1-pyrrolidinyl)-ethyl chloride,
β-piperidino-ethyl chloride,
γ-(1-pyrrolidinyl)-propyl chloride,
γ-piperidino-propyl chloride,
γ-hexamethyleneimino-propyl chloride,
γ-piperidino-β-methyl-propyl chloride,
β-(4-morpholinyl)-ethyl chloride,
γ-(4-morpholinyl)-propyl chloride,
β-(4-methyl-1-piperazinyl)-ethyl chloride,
γ-4-(methyl-1-piperazinyl)-propyl chloride,
β-(N-carbo-methoxy-methylamino)-ethyl chloride,
β-(N-carbomethoxy-ethylamino)-ethyl chloride,
γ-(N-carbomethoxy-methylamino)-propyl chloride,
γ-(N-carboethoxy-methylamino)-propyl chloride, and
γ-(N-carbomethoxy-ethylamino)-propyl chloride as well as the corresponding bromides and p-toluene sulfonic acid esters.

The intermediate compounds of Formula XXIII can be isolated and purified from the reactive mixture by the conventional methods used for such purposes in the case of organic bases; those in which $R_4$ is alkyl have, apart from being intermediates in this process, additional utility in the pharmaceutical field, described further below.

The 10-oxo function of the compounds of Formula XXIII is reducible, preferably catalytically, to a methylene group, thereby obtaining compounds of the Formula XXI, when $R_4$ in the starting Compound VII is lower alkyl, and compounds of Formula XXIa, when $R_4$ in the starting Compound VII is benzyl.

Compounds of Formula XXIII in which $R_4$ is benzyl and $Am_4$ is N-benzyl-N-lower alkyl-amino, are converted by a hydrogenation step directly to compounds of Formula XXIa in which $Am_4$ is mono-lower alkyl-amino.

The acyl radical which may be present in $Am_4$ can be removed by acid or base-catalyzed hydrolysis, subsequent to the hydrogenation step.

The catalytic hydrogenation step is carried out advantageously at elevated temperatures and pressures, namely about 150 to 220° C. and 100 to 200 atmospheres, and preferably at 180 to 200° C. and about 150 atmospheres, and can be carried out directly with the crude reaction product resulting from the preceding step preferably in dioxan as the solvent. As catalyst, copper chromite can be used, preferably on a suitable carrier such as barium carbonate.

Alternatively, the compounds of Formula XXI can be converted to those of Formula XXIa by acid hydrolysis, preferably using concentrated hydrohalic acid such as hydrochloric and preferably 48% hydrobromic acid, at reflux temperature.

*Flowsheet*

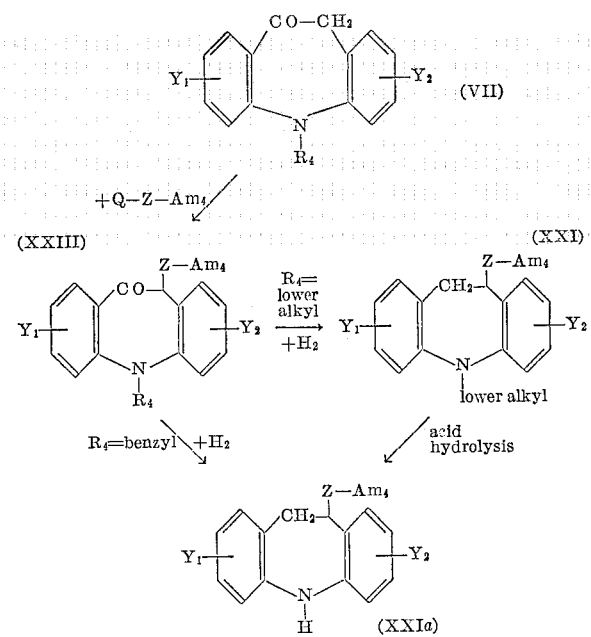

The transposition of the —Z—$Am_5$ substituent from 5-position to the 10-position as in compounds of the formula

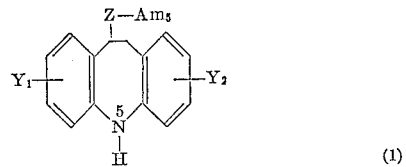

where $Y_1$ and $Y_2$ have the above meanings and are preferably hydrogen, and wherein Z, $Y_1$ and $Y_2$ have the above given meanings, Z being preferably ethylene or n-propylene, and $Am_5$ is either —N(lower alkyl)$_2$, —NH(lower alkyl), 1-pyrrolidyl, 1-piperidyl, 4-lower alkyl-1-piperazinyl and 4-(hydroxy-lower alkyl)-1-piperazinyl, leads to a novel unexpected pharmacodynamic spectrum in which the anticholinergic and antihistaminic components are eliminated, the latter component especially for those compounds in which Z contains more than two directly enchained carbon atoms, while the reserpine-antagonistic and anticonvulsant components as well as the anesthesia potentiating effects are preserved, where the same have been present in the 10,11-unsubstituted isomers.

The compounds of Formula XXIII in which $R_4$ is methyl, and in particular those in which —Z—$Am_4$ is di-lower alkylaminoethylene and 4-methyl-piperazinyl-alkylene and Z has preferably from 2 to 4 carbon atoms, have powerful serotonin- and reserpine-antagonistic properties and also potentiating effects on anesthetics, while being free from anticholinergic and free from antihistaminic activities. They are, therefore, useful in the treatment of gastric ulcers, of the effects of certain neoplasms (argentaffinomas), and in the treatment of mental disorders due to serotonin overbalance.

Their pharmacodynamic spectra are thus dissimilar from those of the dibenz-azepine 10-ones having the corresponding —Z—$Am_4$ grouping in 5-position, which are described in our co-pending application Serial No. 223,301, filed on September 11, 1962 (now U.S. Patent No. 3,144,442), as being powerful antihistaminics and are essentially free from serotonin- and reserpine-antagonistic, from sedative and anesthesia-potentiating properties.

The following further illustrates the production of the new compounds according to this invention and their use as intermediates. The temperatures are in degrees centigrade.

*Example*

(a) 22.3 grams (g.) of 5-methyl-5H-dibenz[b,f]azepine-10(11H)-one are dissolved in 250 ml. of abs. benzene and a suspension of 4.0 g. of sodium amide in toluene is added. The mixture is refluxed for 3 hours while introducing nitrogen, it is then cooled to 50°, 13.5 g. of freshly distilled γ-dimethyl-amino-propyl chloride are added and then the whole is refluxed for 20 hours. The reaction mixture is cooled and water is added. The benzene phase is separated and extracted three times with 1 N hydrochloric acid. The combined acid extracts are made alkaline and then extracted with ether. The ether solution is dried and concentrated. 16 g. of the oil which remains are heated with 48 ml. of 2 N hydrochloric acid for 5 to 10 minutes at 80° and then the hydrochloric acid solution is cooled with ice. The separated crystals of 5-methyl-dibenz[b,f]azepine-10(11H)-one, which have been liberated by hydrolysis from basic enol ether formed as side product, are filtered off and the hydrochloric acid filtrate is made alkaline and extracted with ether. The ether solution is dried, ethanolic hydrochloric acid is added whereupon the hydrochloride of 5-methyl-11-(γ-dimethyl-amino-propyl)-5H-dibenz[b,f]azepine-10(11H)-one crystallizes out. M.P. 236–238°.

The following compounds, for example, can be produced in an analogous manner:

5-methyl-11-(β-dimethylamino-ethyl)-5H-dibenz[b,f]azepine-10(11H)-one;
5-methyl-11-(γ-dimethylamino-β-methyl-propyl)-5H-dibenz[b,f]azepine-10(11H)-one;
5-methyl-11-[β-(1-pyrrolidyl)-ethyl]-5H-dibenz[b,f]azepine-10(11H)-one hydrochloride;
5-methyl-11(γ-piperidino-propyl)5H-dibenz[b,f]azepine 10(11H)-one;
5-methyl-11-[γ-(4'-methyl-1'-piperazinyl)-propyl]-5H-dibenz[b,f]azepine-10(11H)-one;
5-ethyl-11(β-dimethylamino-propyl)-5H-dibenz[b,f]azepine-10(11H)-one;
5-ethyl-11-[γ-(4'-methyl-1'-piperazinyl)-propyl]-5H-dibenz[b,f]azepine-10(11H)-one;
5-isopropyl-11-(γ-dimethylamino-propyl)-5H-dibenz[b,f]azepine-10(11H)-one;

(b) 100 g. of 5-methyl-11-(γ-dimethylamino-propyl)-5H-dibenz[b,f]azepine-10(11H)-one are dissolved in 1000 ml. of dioxan and hydrogenated over 100 g. copper chromite/barium carbonate catalyst at 180 to 200° and 150 atm. pressure. After cooling and removal of the catalyst by filtration, the solvent is evaporated in vacuo and the residue distilled giving 5-methyl-10-(γ-dimethylamino-propyl)-10,11-dihydro-5H-dibenz[b,f]azepine of B.P. 172-6°/0.008 Torr.

In an analogous manner 5-methyl-11-(β-dimethyl-amino-ethyl)-5H-dibenz[b,f]azepine-10(11H)-one gives 5-methyl-10(β-dimethyl-amino-ethyl) - 10,11 - dihydro-5H-dibenz[b,f]azepine, and 5-methyl-11-[β-(1-pyrrolidyl)-ethyl]-5H-dibenz[b,f]azepine-10(11H)-one gives 5-methyl - 10 - [β - (1 - pyrrolidyl) - ethyl] - 10,11 - dihydro-5H-dibenz[b,f]azepine.

(c) 10 g. of 5-methyl-10-(γ-dimethylamino-propyl)-10,11-dihydro-5H-dibenz[b,f]azepine are boiled under reflux for two hours with 35 ml. hydrobromic acid (48%). The mixture is then concentrated in vacuo and the residue dissolved in water. The solution is made alkaline and extracted with ether, the ether extract separated, dried and evaporated to dryness. The residue is distilled in a high vacuum, giving 10-(γ-dimethylamino-propyl)-10,11-dihydro-5H-dibenz[b,f]azepine of B.P. 160°/0.004 Torr. The neutral fumarate of this base has M.P. 276-278°.

In an analogous manner 5-methyl-10-(β-dimethyl-amino - ethyl) - 10,11 - dihydro - 5H - dibenz[b,f]azepine gives 10-(β-dimethylamino-ethyl)-10,11-dihydro-5H-dibenz[b,f]azepine.

5 - methyl - 5H - dibenz[b,f]azepine - 10(11H) - one, the starting compound in the present example, is prepared as follows:

(i) 407 parts of bromine in 250 parts by volume of chloroform are dropped into a solution of 600 parts of 5-acetyl-5H-dibenz[b,f]azepine in 1200 parts by volume of chloroform at 5-10° with stirring. The decolorised solution is then cooled to −10° while stirring, when crystallisation of the 5-acetyl-10,11-dibromo-10,11-dihydro-5H-dibenz[b,f]azepine takes place. It is filtered off by suction and dried in vacuo. M.P. 136-138°.

(ii) 125 parts of 5-acetyl-10,11-dibromo-10,11-dihydro-5H-dibenz[b,f]azepine are introduced with vigorous stirring into a solution of 135 parts of sodium in 1000 parts by volume of distilled methanol and the solution is then boiled under reflux for 16 hours. 500 parts by volume of methanol are then distilled off and the reaction solution is boiled under reflux for a further 24 hours. After cooling, 500 parts of water are slowly added, when the crystalline crude product is precipitated. It is filtered off by suction, thoroughly washed with water and dried in vacuo at 60°. 10-methoxy-5H-dibenz[b,f]azepine of M.P. 124° is obtained by recrystallisation from 350 parts by volume of absolute alcohol.

(iii) 111.5 parts of 10-methoxy-5H-dibenz[b,f]azepine and 95 parts of methyl iodide are dissolved in 500 parts by volume of absolute thiophene-free benzene. A suspension of 26 parts of sodamide in toluene is dropped in at 43-45° over a period of 1½ hours. The reaction mixture is thereupon heated for an hour at 55° and then boiled under reflux for an hour. After cooling, it is treated with water, and the benzene layer is separated and thoroughly washed with water. It is then dried over sodium sulphate and concentrated, when crystallization occurs. The crystals are filtered off by suction and washed with a little cold benzene. The 5-methyl-10-methoxy-5H-dibenz[b,f]azepine obtained melts at 145-146°.

(iv) 116 parts of 5-methyl-10-methoxy-5H-dibenz[b,f]azepine are boiled under reflux for an hour in 500 parts of 2 N hydrochloric acid. After cooling, the precipitated crystals are dissolved in benzene. The benzene solution is washed with water, dried and concentrated, when 5-methyl-5H-dibenz[b,f]azepine-10(11H)-one crystallizes out. It is filtered off by suction and washed with a little benzene. M.P. 104°.

What is claimed is:
1. A compound of the formula

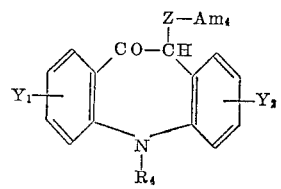

wherein each of $Y_1$ and $Y_2$ is a member selected from the group consisting of chlorine, bromine and lower alkyl, Z is alkylene with maximally 6 carbon atoms, $R_4$ is a member selected from the group consisting of lower alkyl, allyl and benzyl, $Am_4$ is a member selected from the group consisting of di-lower alkylamino, pyrrolidino, piperidino, morpholino, 4-methyl-piperazino, N-benzyl-N-lower alkylamino, N-formyl-N-lower alkylamino, N-lower alkoxy-carbonyl-N-lower alkylamino, N-lower alkanoyl-N-lower alkylamino and N-benzoyl-N-lower alkylamino.

2. A compound according to claim 1, said compound being the 5-methyl-11-(2'-dimethylaminoethyl)-5H-dibenz[b,f]azepin-10(11H)-one.

3. A compound according to claim 1, said compound being the 5-methyl-11(3'-dimethylamino-n-propyl)-5H-dibenz[b,f]azepin-10(11H)-one.

4. A compound according to claim 1, said compound being the 5-methyl-11-(3'-dimethylamino-2'-methyl-n-propyl)-5H-dibenz[b,f]azepin-10(11H)-one.

5. A compound according to claim 1, said compound being the 5-methyl-11-(3'-[4"-methyl-piperazinyl-(1")]-n-propyl)-5H-dibenz[b,f]azepin-10(11H)-one.

No references cited.

ALEX MAZEL, *Primary Examiner.*

ALTON D. ROLLINS, *Assistant Examiner.*